United States Patent

Nagamura et al.

[15] 3,645,700
[45] Feb. 29, 1972

[54] APPARATUS FOR FLUIDIZED-BED REACTIONS

[72] Inventors: Masao Nagamura; Hiromichi Seya; Takaya Iseki; Mikio Suzuki, all of Chiba-ken, Japan

[73] Assignee: Asahi Glass Co., Ltd., Tokyo, Japan

[22] Filed: Jan. 19, 1970

[21] Appl. No.: 3,910

[30] Foreign Application Priority Data

Jan. 24, 1969    Japan.....................................44/4735

[52] U.S. Cl..............................23/284, 23/288 S, 165/104, 208/163, 263/21 A
[51] Int. Cl. ......................................................B01j 9/18
[58] Field of Search .......................23/284, 288 S, 1 F, 1 FT; 208/163; 75/9, 26, 34; 260/694, 662; 117/DIG. 6; 165/104; 34/57 A; 263/21 A

[56] References Cited

UNITED STATES PATENTS 2,750,681    6/1956    Berry................................23/288 S X
2,695,219    11/1954    Upham................................23/288 S
2,982,623    5/1961    Johnson..............................23/288 S

FOREIGN PATENTS OR APPLICATIONS 1,107,422    3/1968    Great Britain.........................23/284

Primary Examiner—Joseph Scovronek
Attorney—Kurt Kelman

[57] ABSTRACT

The invention provides an improved vessel for fluidized-bed reactions, characterized by the provision of metal or nonmetal projections of various shapes at calculated intervals on the internal sidewall of the vessel. The improved vessel results in a substantially reduced wear of the internal wall of the fluidized-bed vessel without detracting from the heat-exchange efficiency between the internal wall and the exterior of the vessel.

8 Claims, 5 Drawing Figures

PATENTED FEB 29 1972

3,645,700

INVENTORS
MASAO NAGAMURA
BY HIROMICHI SEYA
TAKAYA ISEKI
MIKIO SUZUKI

APPARATUS FOR FLUIDIZED-BED REACTIONS

BACKGROUND OF THE INVENTION

1. Field of the Invention

This invention relates to fluidized-bed apparatus having improved structures. More particularly, the invention relates to an improved fluidized-bed reactor having an internal wall resistant to abrasion and wear and a large heat-exchange capacity between the internal wall and exterior thereof, the improvement comprising the provision of projections of various shapes at calculated intervals on the internal wall of the containing vessel for fluidized-bed reactions.

2. Description of the Prior Art

In fluidized-bed apparatus in general, a fluid is introduced into the apparatus from below to convert a bed of solid particles to a suspended mass that is known as a fluidized bed. In such an apparatus, the interior of the fluidized bed is a substantially homogeneous mixture with good contact ensured between the fluid and particulate solid. Furthermore, despite the fact that the fluidized-bed apparatus is mechanically simple, involving no intricate mechanical components, it lends itself to a continuous processing of materials in large quantities. It also affords other advantages, such as the ease of adjustment of temperature and other reaction conditions. In many cases, solid particles of small diameter are used in such apparatus, with the result that the total surface area of the particulate solid is extremely large and, in addition, the particles are maintained in a completely mixed state in the bed. Therefore, the fluid easily attains an equilibrium temperature with the solid particles in a comparatively short span after it enters the bed and a uniform temperature is maintained throughout a substantial part of the bed. Furthermore, by the vigorous movement of the particles within the fluidized-bed vessel, the boundary film of the fluid cannot be too thick on the vessel wall so that the coefficient of heat transfer is necessarily high between the fluidized bed and vessel wall. Thus, a fluidized-bed apparatus makes it easy to control the temperature of the fluidized bed from outside the vessel.

It is for this reason that fluidized-bed apparatus is widely used for reactions which involve an evolution or absorption of considerable heat or for reactions between a particulate solid and a fluid, where the control of the reaction temperature is normally difficult. For example, fluidized-bed apparatus is employed to advantage in the catalytic cracking of petroleum oil, the catalytic oxidation of hydrocarbons, the chlorination or oxychlorination of hydrocarbons and the fluidized-bed roasting of sulfide minerals. However, while the fluidized-bed reactor offers a high coefficient of heat transfer through its wall, it has the serious disadvantage that its internal wall is worn by the solid particles forming the fluidized bed. Especially when the reactor wall contacts corrosive gases at elevated temperatures such as in the chlorination of hydrocarbons, the abrasion of the wall by the suspended particles is quite serious. To overcome the disadvantage, it has heretofore been proposed to line the internal wall of fluidized-bed apparatus with a metallic or nonmetallic material. However, lining the reactor involves complicated procedures and techniques which make the practice disadvantageous. Furthermore, where the seal between the reactor wall and lining is not sufficiently tight and there is gap between them, the coefficient of heat transfer through the wall is reduced. Though the use of a metallic lining material prevents the wear of the reactor wall due to the solid particles without sacrificing the heat transfer capacity between the internal wall and exterior of the reactor, it is necessary to ensure that the metallic lining material has sufficient corrosion resistance as well as adequate abrasion resistance in order to impart sufficient wear resistance to the reactor wall. As metallic materials which satisfy those requirements, such materials as nickel metal, Monel metal, Inconel metal, Hastelloy metal, etc., are known. However, because those materials are expensive, the production cost of the fluidized-bed reactor is significantly increased, not to speak of the productional disadvantages described above. On the other hand, when nonmetallic lining materials such as brick, castables, cement, etc., are employed, the abrasion and corrosion resistance of the reactor wall is improved more effectively, but the high coefficient of heat transfer which is a major advantage of the fluidized-bed reactor, is considerably impaired. Furthermore, nonmetallic lining materials afford poor adhesion with the reactor wall which is usually made of metal, with the result that the lining tends to strip off under the influence of vigorous fluidization.

In addition, if the lining of such a lined fluidized-bed reactor is damaged from wear or corrosion, much labor is required for repairing, and it is particularly difficult to repair a localized damage to the lining. There also is the disadvantage that a localized damage readily propagates throughout the entire lining.

SUMMARY OF THE INVENTION

It is an object of the present invention to provide a fluidized-bed reactor which is highly resistant to wear and abrasion and has a large heat-exchange capacity between its internal wall and the outside atmosphere.

It is another object of the invention to provide a fluidized-bed reactor which can be built easily and at reduced cost.

Still another object is to provide a fluidized-bed reactor having the structure of which makes for easy repairing and especially easy local repairing.

Still another object is to provide a fluidized-bed reactor which has an extended serviceable life even when it is used under rigorous conditions, such as where the internal wall is contacted with corrosive gases at elevated temperatures.

Another yet object is to provide a fluidized-bed reactor having a novel construction, wherein the containing vessel and the protective element for its internal wall are independently formable.

Still another object is to provide a fluidized-bed reactor having a novel structure, where a localized damage to its internal wall is less liable to propagate.

Other objects and advantageous features of the present invention will become apparent from the following description of the invention.

Those objects may be accomplished by a fluidized-bed reactor having a novel structure where a plurality of metallic or nonmetallic projections of various shapes are disposed at calculated intervals on the internal sidewall of the reactor.

BRIEF DESCRIPTION OF THE DRAWING

In the accompanying drawing.

DETAILED DESCRIPTION OF THE INVENTION, INCLUDING PREFERRED EMBODIMENTS

Figure 1:
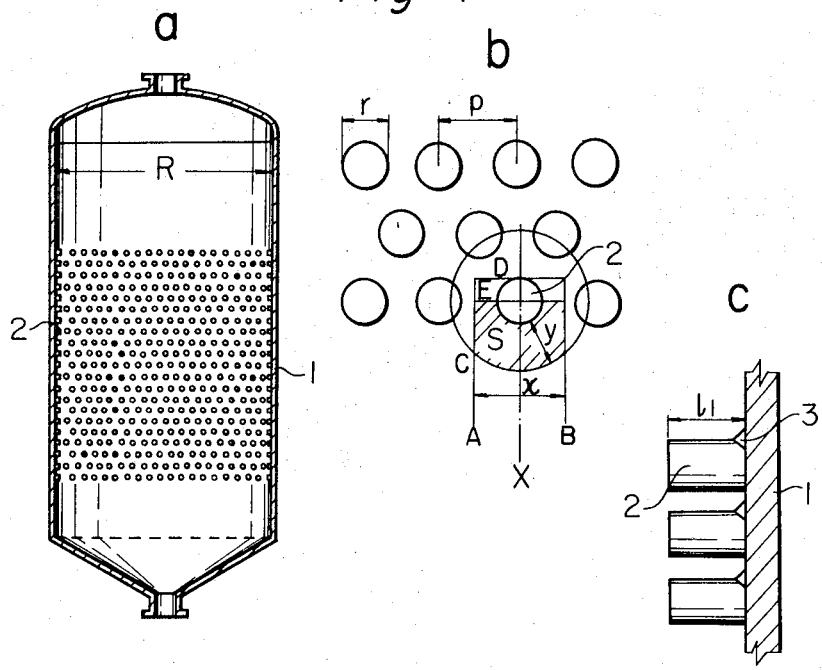
FIG. 1 shows a typical working example of the fluidized-bed reactor according to the present invention, wherein FIG. 1 *a* is a schematic diagram illustrating the overall structure of said reactor, FIG. 1 *b* is a front view, on exaggerated scale, showing the internal wall of said reactor, and FIG. 1 *c* is a side-elevation view, on exaggerated scale, of the internal wall.

In the fluidized-bed reactor according to the present invention, the metallic or nonmetallic projections to be disposed on the internal sidewall of the containing vessel in which a fluidized bed of solid particles is to be formed may be made of varied materials. For instance, such metals as iron, steel, stainless steel, copper, copper alloy, aluminum, aluminum alloy, nickel, nickel alloy, titanium, titanium alloy, etc., as well as such nonmetallic materials as porcelain, ceramics, brick, carbon, graphite, synthetic rubber, etc., may be employed. Those materials are merely illustrative and projections of any other metallic and nonmetallic material may be employed in the fluidized-bed reactor according to the present invention, the choice being dependent upon the purpose of using the reactor. For instance, in applications where especially high wear resistance is required of the internal wall of the reactor, projections of particularly abrasion-resistant materials are selected. When the intended use of the reactor requires good heat-exchange efficiency and corrosion resistance, projections made of materials which satisfy both the requirements must be chosen.

In the fluidized-bed reactor according to the present invention, the internal wall is protected so effectively by those projections that it is not always necessary to ensure that the material of the reactor itself be resistant to abrasion and other factors. Stated differently, the reactor vessel may be built of rather inexpensive materials and, accordingly, the production cost of the equipment may be significantly reduced. Furthermore, in the fluidized-bed reactor according to this invention, the installation of such projections does not cause a reduction in heat-exchange capacity of the reactor wall. Thus, according to the present invention, by ensuring that the projections be made of a material having superior abrasion resistance and the containing vessel itself be made of a material superior in heat-exchange capacity and corrosion resistance, it is possible to provide a fluidized-bed reactor which is superior in the three characteristics, i.e., wear resistance, corrosion resistance and heat-exchange capacity.

Regarding the methods for installing said projections on the internal wall of the fluidized-bed reactor according to this invention, many varied methods may be employed without any particular restrictions. For example, such conventional methods as welding and the method involving the use of an adhesive agent may be mentioned. In case the containing vessel and the projections are made of the same material, the latter may be formed by casting one-piece with the internal wall of the vessel.

The fluidized-bed reactor according to the present invention is further advantageous in that the projections can be easily installed on the internal wall of the vessel.

Furthermore, the reactor according to this invention offers the following repairing advantages. Thus, not only is repairing facilitated, but the protection of the internal wall against abrasion can be thorough. Since each of the projections can be installed independently of each other on the internal wall of the reactor, it is sufficient to repair only the damaged projection. In contrast, in the case of the conventional lined fluidized-bed reactor, it is extremely difficult to selectively repair the affected points. Furthermore, the localized damage to the lining of such conventional fluidized-bed reactor tends to propagate easily throughout the entire lining so that the serviceable life of the lining is reduced. In the fluidized-bed reactor according to this invention, there is no reduced tendency toward propagation of localized damage so that the serviceable life of the projections is not reduced. Thus, in accordance with the invention, the useful life of the reactor is considerably extended.

In the fluidized-bed reactor according to the present invention, the projections are desirably made of a material having good abrasion resistance, but since as aforesaid it is not only comparatively easy to repair the damaged parts but the propagation tendency of the damage is reduced, it is not always necessary to employ projections having particularly high resistance to abrasion.

Therefore, the projections may be made of a material which is easily available at comparatively low cost and this aspect alone accounts for the reduced production cost of the reactor. For instance, by installing stainless steel projections on the internal wall of the reactor according to this invention, the useful life of the reactor can be considerably increased even when the reactor is used in applications where the internal wall is brought into contact with corrosive gases at elevated temperatures, such as in the chlorination of hydrocarbons.

Furthermore, in the fluidized-bed reactor according to the present invention, it is also possible to install projections made of a highly abrasion-resistant material in the areas of the internal wall which are more liable to be abraded by the suspended solid particles and projections of a less expensive material in the remaining portion of the wall, whereby a substantial equalization of the projections in terms of useful life can be attained and, accordingly, the serviceable life of the fluidized-bed reactor can be increased. In this connection, projections of materials which have good abrasion and corrosion resistance, such as nickel, Monel, Inconel, Hastelloy, etc., may be provided in the portions of the internal wall which are normally subject to the severest wear.

In the fluidized-bed reactor, projections of many different shapes, especially round bars, square bars, bars having an elliptical section, round tubes, square tubes, plates, hemispherical projections, conical projections, pyramidal projections, etc., may be employed almost without limitation as to configuration. However, the shape of such a projection, especially the terminal shape, width, length and other factors, is desirably selected in connection with the inner diameter of the fluidized-bed reactor. Regarding the terminal shape of the projection, if the cross-sectional area of the terminal portion of the projection is too small, that is to say, if the projection has a pointed end, the suspended solid particles forming a fluidized bed might be disintegrated. Conversely, if the cross-sectional area of the terminal portion of the projection is too large, such drawbacks are encountered as a reduction in heat-exchange between the internal wall and exterior of the reactor and the difficulty of installing the projections on the internal wall of the containing vessel. Therefore, in the fluidized-bed reactor according to the present invention, the projections are desirably uniform in cross-sectional shape, from the viewpoint of ease of manufacture, for instance, and may each assume the form of a bar, tube or plate.

Our research has revealed the following. Thus in the case of a bar-shaped or tubular projection, its cross-sectional area (in the case of a tubular projection, the area is calculated as $\pi r^2$ where r is the outside diameter is preferably in the range of about one four-hundreth to about one two-hundred fifty-thousandth of the cross-sectional area of the fluidizing space of the reactor (i.e., the sectional area perpendicular to the direction of flow of the suspended particles). In the case of a platelike projection, selection of the proper dimension (horizontal length) of the projection perpendicular to the flow of the suspended particles and along the side wall is more important than its dimension (thickness) perpendicular to the internal wall of the reactor on which it is to be installed and its dimension (vertical length) parallel to the flow of the suspended particles. Furthermore, in the case of a platelike projection, its horizontal dimension is desirably equal to the range of $(0.01 \times \text{inside diameter of vessel})^{1/2}$ to $(200 \times \text{inside diameter of vessel})^{1/2}$ when the vessel is cylindrical. However, so far as the platelike projection is concerned, if it has a curved shape corresponding to the curvature of the inner wall of the fluidizing vessel, its horizontal dimension may be as long as the circumferential dimension of the internal wall of the vessel.

Furthermore, if the platelike projection in the form of a ribbon is installed in a helical configuration on the internal wall of the vessel, the projection may have a horizontal dimension in excess of the circumferential length of the internal wall of the vessel.

In the fluidized-bed reactor according to the present invention, the dimension of the projection perpendicular to the internal wall of the fluidizing vessel (i.e., the thickness of the projection) is related with the serviceable life and heat-exchange capacity of the reactor. Generally speaking, as the projection gains in thickness, the useful life of the equipment is increased. It follows that the thickness of the projection is desirably as great as practicable. However, if the projection is too thick, the heat-exchange capacity of the reactor is lowered and the effective space of the reactor is also reduced. It also entails installation difficulties. Therefore, in order that the fluidized-bed reactor may be commercially useful, it is desirable to install projections from 5 millimeters to 200 millimeters in thickness.

In a fluidized-bed reactor of which a particularly large heat-exchange capacity is required, it is more desirable to install projections from 5 millimeters to 100 millimeters in thickness.

In the fluidized-bed reactor according to the present invention, the mode of arrangement of projections on the internal wall of the fluidizing vessel is as important a factor as the shape of projection mentioned above (inclusive of its terminal shape, thickness, horizontal dimension, etc.,) in a further effective attainment of the result according to the invention. In the fluidized-bed reactor according to the present invention, it is desirable, for the prevention of wear of the internal wall, to ensure that the solid particles forming a fluidized bed selectively contact the projections without directly contacting the reactor wall. It is for this reason desirable to adopt a staggered arrangement of projections with respect to the direction of flow of the suspended particles. The arrangement may be a triangular staggered arrangement or a square staggered arrangement. It goes without saying that other arrangements may be employed as well insofar as the objects of the invention may still be accomplished.

In the fluidized-bed reactor according to the present invention, the interval of projections constituting a arrangement is also an important factor and is desirably selected with reference to the sectional area and the mode of arrangement of the projections. Thus, when the interval is small, the mode of arrangement has no significant influence, but when the interval is large, the mode of arrangement has an important meaning. Furthermore, when the shapes of the projections, particularly the sectional shape and thickness of each projection, are small, it is desirable to select small intervals. However, if larger projections are adopted, it will not necessarily desirable to increase the intervals in proportion. In the fluidized-bed reactor according to the present invention, what is important for the selection of the proper mode of arrangement and interval is to ensure that the solid particles forming a fluidized bed will substantially not directly contact the internal wall of the reactor.

Our studies have shown that in order to ensure that the solid particles forming a fluidized bed will not directly contact the internal wall, it is desirable to adopt the following basic principle of arrangement of projections. Thus, the arrangement of projections is selected based on the dimension L of the projection which is the largest horizontal dimension parallel to the internal wall of the reactor and the dimension T of the projection as measured perpendicularly from the wall surface to the forward end of the projection. When this selection is made, the following five imaginary lines can be drawn on the internal wall of the containing vessel. Thus, two parallel lines A and B, which are symmetrical about the vertical centerline of the particular projection (which coincides with the direction of flow of the suspended particles) can be drawn at an interval which is in the range from $(2 \times L)$ to $(1 \times L)$.

Then, a circumferential line C can be drawn which encircles the projected figure P of the projection on the internal wall at a predetermined interval of $(0 \times T)$ to $(6.5 \times T)$ and particularly $(4 \times T)$.

On the internal wall of the reactor, there can also be drawn a horizontal line D in tangential relation with the uppermost end of the projected figure P of the projection with respect to the direction of flow of the suspended particles and a line E which passes through the two ends of said projected figure P which have the largest dimension as measured in the horizontal direction. When said projected figure P has two or more sets of two ends having the largest dimension as measured in the horizontal direction, the aforesaid line E is drawn for the uppermost set with respect to the direction of flow of the suspended particles. Now, the protective zone defined by the projection can be explained as follows. Thus, the zone which is located between said parallel lines A and B, within said circumferential line C, below said line D with respect to the direction of flow of the suspended particles and below said line E with respect to the direction of flow of said particles is the protective zone of the particular projection. Such projections are installed on the internal side wall of the reactor in which a fluidized bed is to be formed, so that the protective zones of said projections substantially completely cover the entire surface of the internal wall.

In the fluidized-bed reactor according to the present invention, for the purpose of preventing propagation of localized damage, it is preferable to install a plurality of projections in isolation from each other. However, it is also possible to install such projections as a coherent element on the internal wall of the reactor according to the invention. For instance, a ribbon-like projection may be installed in a spiral configuration on the internal wall as mentioned above, or a meshlike projection may be provided on the internal wall. Furthermore, it is not always necessary to install projections all over the internal side wall of the fluidized-bed reactor according to the present invention, but projections may be provided so that they will partially cover the internal sidewall.

A few working examples of the fluidized-bed reactor according to the present invention will hereinafter be described with reference to the accompanying drawings.

FIG. 1 shows an example of the fluidized-bed reactor according to the invention, wherein rod-shaped projections 2 are arranged by the staggered arrangement method on internal sidewall 1 of a reactor where a fluidized bed of solid particles is to be formed. The containing vessel of the fluidized-bed reactor according to this invention has an inside diameter of R. As said projections 2, the reactor is provided with round bars having an outside diameter of $r$ and a length of $l_1$. FIG. 1a is a schematic view showing the overall structure of the fluidized-bed reactor. FIG. 1b is an expanded view of the internal wall of the fluidized-bed reactor, showing the arrangement of projections. In FIG. 1c, projections are disposed in the triangular staggered arrangement. FIG. 1c is a partially enlarged view showing the side wall 1 provided with projections 2, as viewed from one side. In FIG. 1c, a cementing layer 3 is interposed between the projection 2 and the internal sidewall 1 of the reactor. When the projection is a round bar, its outside diameter $r$ is its dimension (horizontal dimension) which is perpendicular to the direction of flow of the solid particles in the fluidized bed and parallel to the surface of the internal wall of the containing vessel, and this dimension is desirably in the range from R/500 to R/20. The length $l_1$ of the barlike projection is its dimension (thickness) perpendicular to the internal wall surface, and in order that the fluidizing effect will not be jeopardized, this dimension is desirably in the range from R/1,000 to R/20. The interval P of projections is desirably in the range of $(1 \times r)$ to $(2 \times r)$ in the case of a triangular staggered arrangement, or from $(1 \times r)$ to $(1,415 \times r)$ for square staggered arrangement.

Referring to the fluidized-bed reactor according to the present invention as illustrated in FIG. 1, the protective zones or the zones of the internal wall area protected by projections, which have heretofore been defined, will now be described in detail. The largest dimension L of the projection disposed on the internal wall of the containing vessel which is parallel to the wall surface and extends from one end to the other of the projection corresponds, in this particular working example, to the outside diameter $r$ of the projection. The dimension T which is defined as a distance from the surface of said internal wall to the forward end of said projection as measured perpendicular to the wall surface corresponds, in this particular working example, to the length $l_1$ of the projection. In FIG. 1b, X is the vertical centerline of the projection 2. Two lines A and B are mutually parallel and symmetrical about said centerline X. The interval $x$ of the two lines A and B lies within the range of $(2 \times r)$ to $(1 \times r)$. Around the projection 2, a circumferential line C is drawn at a predetermined interval of $y$. The interval $y$ is less than (the length $l_1$ of the round-bar projection 2) $\times 6.5$ and, preferably, less than $(4 \times l_1)$. There are also drawn a line D which is tangential to the uppermost end of the projection 2 with respect to the direction of flow of the suspended particles and a line E which passes through the two ends of the projection 2 which give the largest horizontal dimension. Then, according to the aforedescribed standard, the zone S defined by the five lines A, B, C, D and E (the shaded area of FIG. 1b) is the protective zone of the particular projection. Similarly, the protective zones can be assigned to the other projections. Such protective zones can be drawn for all the projections provided on the entire wall surface. The arrangement of said projections is selected so that those protective areas will substantially completely cover the entire surface of the internal wall exclusive of the areas occupied by the projections themselves.

Figure 2:
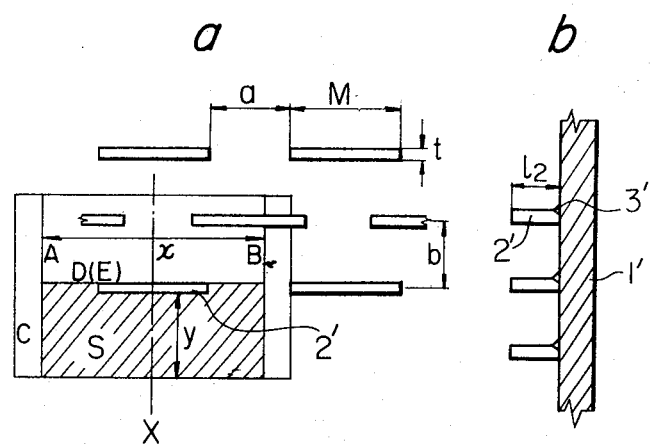
FIG. 2 *a* is a front view, on exaggerated scale, showing another modification of the internal wall of the fluidized-bed reactor according to the present invention, and FIG. 2 *b* is a side-elevation view, on exaggerated scale, showing said modification.

FIG. 2 shows an example of the reactor wherein the projections are rectangular plates 2', each of which has a length of M, a width of $l_2$ and a thickness of $t$, said projections having been bonded to the internal wall 1' through a cementing layer 3' interposed therebetween. In FIG. 2, only a portion of the entire structure of the fluidized-bed reactor is shown. FIG. 2a shows a pattern of arrangement of projections on the internal wall of the reactor. FIG. 2b is a lateral view of the arrangement shown in FIG. 2a. The dimension M of the rectangular projection 2' which is perpendicular to the direction of flow of the suspended particles and parallel to the wall surface is chosen mainly based on the internal diameter R' of the containing vessel of the fluidized-bed reactor. It is usually preferable that the rectangular projection has a dimension of M in the range from $\sqrt{0.01 \times R'}$ to $\sqrt{200 \times R'}$. The width $l_2$ of said projection 2' corresponds to the dimension of the projection which is perpendicular to the internal wall of the reactor and is desirably in the range from R'/1,000 to R'/20. The vertical dimension $t$ (thickness) of the projection 2' which is coincidental with the direction of flow of the suspended solid particles is virtually optional and may be selected as required. The intervals a and b of the projections may be selected based on the aforesaid values of M and $l_2$. Usually, the preferred value of $a$ is 0 to M, and that of $b$ is $(0 \times l_2)$ to $(6.5 \times l_2)$, particularly below $(4 \times l_2)$.

The protective zones defined above will now be briefly described for the projections illustrated in FIG. 2.

Referring to FIG. 2a, X is a vertical centerline of the projection 2', and A and B are parallel lines which are symmetrical about said centerline X. The interval $x$ of the two parallel lines A and B is in the range from $(2 \times M)$ to $(1 \times M)$. Around the projection 2', a circumferential line C is drawn at a predetermined interval of y. The interval y is in the range from $(0 \times l_2)$ to $(6.5 \times l_2)$ and, preferably, less than $(4 \times l_2)$. The line D which is tangential to the uppermost end of the projection 2' with respect to the direction of flow of the suspended solid particles and the line E which passes through the two ends of projection 2' which give the largest horizontal distance are equal to each other in this particular working example. The zone S (shaded area) defined by the above five lines A, B, C, D and E is the protective zone of the particular projection 2'.

The fluidized-bed reactor of the present invention will hereinafter be described by the following examples, it being to be understood, however, that many changes and modifications may be made within the scope of the present invention.

EXAMPLE 1

Using the fluidized-bed reactor illustrated in FIG. 1, methane was thermally chlorinated into various chloromethane samples.

The containing vessel of this particular reactor was a cylinder of nickel alloy which had an inner diameter of 1,100 millimeters. Round bars of stainless steel, each of which measures 10 mm. in outside diameter and 20 mm. in length were disposed on the internal wall (nickel alloy). Those projections were welded to the internal wall in triangular staggered arrangement, 15 mm. in pitch. Sand was used as a solid particulate material forming a fluidized bed and the reactor was charged with sand in such a quantity that the bed height was 2,000 mm. when standing. Chlorine gas (flow rate 100 m.³/hr.), methane gas (flow rate 50 m.³/hr.) and nitrogen gas (flow rate 150 m.³/hr.) were introduced from the bottom of the reactor to fluidize the sand particles. The fluidized bed attained a height of 2,600 mm. The internal wall of the vessel encircling the fluidized bed had the projections described above. The thermal chlorination reaction was conducted at the temperature of 350° C. and at atmospheric pressure. The reaction temperature was controlled by the jacket externally located with respect to the reactor wall.

In this example, the wear rate of the internal wall of the reactor was 0.05 mm./year; the wear rate of the projections was 0.7 mm./year and the overall coefficient of heat transfer between the fluidized bed and the exterior of the reactor was 340 kcal./m.²/hr./° C.

In the absence of projections on the internal wall, the wear rate of the internal wall was 1.5 mm./year and the overall coefficient of heat transfer between the fluidized bed and the exterior of the reactor was 300 kcal./m.²/hr./° C. It will thus be clear that the fluidized-bed reactor according to the present invention features an extremely low wear rate and a satisfactory heat-exchange capacity.

For the above example, as well as for the subsequent examples, the overall coefficient of heat transfer was calculated on the basis of the measured values of the required removal of calories, the heat-conductive area and the temperature difference between the fluidized bed and the cooling medium within the jacket. To determine the wear rate of the internal wall of the reactor, the wear values were measured twice a year for two years at four points, each at the heights of 500 mm., 1,000 mm., 1,500 mm. and 2,000 mm. above the gas distributor of fluidized-bed or at a total of 16 points, and the average of those 16 values was taken.

EXAMPLE 2

In a fluidized-bed reactor similar to the one used for in example 1, round bars of stainless steel measuring 2.9 mm. in outer diameter and 20 mm. in length were welded onto the internal wall of the containing vessel in square staggered arrangement.

Using this fluidized-bed reactor, methane was thermally chlorinated under the same conditions as in example 1. The overall coefficient of heat transfer between the fluidized bed and the exterior of the reactor was 330 kcal./m.²/hr./° C., the wear rate of the internal wall of the reactor was 0.03 mm./year, and the wear rate of the projections was 0.6 mm./year.

EXAMPLE 3

The same fluidized-bed reactor as the one used in Example 1 was charged with chlorine gas (50 m.³/hr.), methane gas (25 m.³/hr.) and nitrogen gas (75 m.³/hr.). Otherwise, the conditions of example 1 were duplicated. The wear rate of the internal wall of the reactor was 0.04 mm./year, the wear rate of the projections was 0.5 mm./year, and the overall coefficient of heat transfer between the fluidized bed and the exterior of the reactor was 280 kcal./m.²/hr./° C. The reduced flow rate of the fluidized bed lowered the wear rate of the projections and resulted in reduced localized wear.

EXAMPLE 4

The same reaction as Example 1 was conducted, the only modification being that the projections were welded onto the internal wall in triangular staggered arrangement. The war rate of the internal wall was 0.05 mm./year and that of the projections was 0.8 mm./year.

EXAMPLE 5

In a fluidized-bed reactor similar to the one used in Example 1, flat plates of stainless steel which measured 100 mm. in length, 20 mm. in width and 4 mm. in thickness were used as projections to be welded onto the internal wall of the containing vessel in the pattern of arrangement illustrated in FIG. 2. The horizontal interval (corresponding to a in FIG. 2) and vertical interval (corresponding to b in FIG. 2) of the projections were 70 mm. and 30 mm., respectively. Otherwise, the same conditions as those of example 1 were employed. The wear rate of the internal wall of the reactor was 0.05 mm./year; the wear rate of the projections was 0.6 mm./year; and the overall coefficient of heat transfer was 280 kcal./m.²/hr./°C.

EXAMPLE 6

In a fluidized-bed reactor similar to the one used in Example 5, flat plates of stainless steel which measured 400 mm. in length, 20 mm. in width and 4 mm. in thickness were welded onto the internal wall of the containing vessel by the staggered arrangement method at a horizontal interval of 70 mm. and a vertical interval of 30 mm. The reaction was conducted under otherwise the same conditions as in Example 1. The wear rate of the internal wall of this reactor was 0.04 mm./year and that of the projections was 0.5 mm./year.

EXAMPLE 7

The stainless steel plates similar to those of Example 6 were welded onto the internal wall by the staggered arrangement method at a horizontal interval of 350 mm. and a vertical interval of 150 mm. The reaction was conducted under otherwise the same conditions as above. The wear rate of the internal wall of the reactor was 0.3 mm./year and that of the projections was 1.0 mm./year.

We claim:

1. In a fluidized-bed reactor, the improvement which comprises a multiple number of heat conductive metallic or nonmetallic independent projections disposed from the inner surface wall of the reactor, said projections disposed at predetermined relative locations spaced uniformly in a circumferential direction in a horizontal plane of the reactor and staggered in the vertical fluid flow direction direction of the reactor to limit impinging of materials fluidized within the reactor against the inner surface wall, the thickness of said projections being from 5 millimeters to 200 millimeters, whereby wear of the inner surface wall is substantially reduced without substantial reduction of heat transfer through the said wall.

2. The fluidized-bed reactor of claim 1, wherein the thickness of said projections if from 5 millimeters to 100 millimeters.

3. A fluidized-bed reactor according to claim 1, wherein said projection is a bar, tube or plate.

4. A fluidized-bed reactor according to claim 1, wherein the cross-sectional area of the forward end of each projection is in the range from one-four-hundreths to one two-hundred-fifty-thousandths of the horizontal cross-sectional area of the space in which a fluidized bed is formed.

5. A fluidized-bed reactor according to claim 3, wherein the dimension of the platelike projection which is perpendicular to the flow of suspended particles and parallel to the internal wall of the containing vessel is in the range of (the inside diameter of the containing vessel × 0.01) one-half to (the inside diameter of the containing vessel × containing vessel ×200) one-half.

6. A fluidized-bed reactor according to claim 3, wherein the barlike or tubular projections on the internal wall present a triangular staggered arrangement having a pitch in the range from (the outer diameter of projection × 1) to the outer diameter of projection × 2).

7. A fluidized-bed reactor according to claim 3, wherein the barlike or tubular projections on the internal wall present a square staggered arrangement having a pitch in the range from (outer diameter of projection × 1) to (outer diameter of projection ×1.415).

8. The fluidized-bed reactor of claim 3, wherein the reactor is cylindrical and the outside diameter of the barlike or tubular projections is one-twentieth to one five-hundredths of the inside diamcter of the reactor.

* * * * *